US008636168B1

(12) United States Patent
Krupa

(10) Patent No.: US 8,636,168 B1
(45) Date of Patent: Jan. 28, 2014

(54) BIODEGRADABLE FOOD SERVICE CONTAINER

(71) Applicant: Ultra Green Inc., Plymouth, MN (US)

(72) Inventor: Calvin S. Krupa, Greenfield, MN (US)

(73) Assignee: Ultra Green Packaging. Inc., Plymouth, MN (US)

( * ) Notice: Subject to any disclaimer, the term of this patent is extended or adjusted under 35 U.S.C. 154(b) by 0 days.

(21) Appl. No.: 13/653,089

(22) Filed: Oct. 16, 2012

(51) Int. Cl.
*B65D 45/20* (2006.01)

(52) U.S. Cl.
CPC .................................... *B65D 45/20* (2013.01)
USPC ......................................................... 220/324

(58) Field of Classification Search
CPC ......... B65D 45/20; B65D 45/16; B65D 45/02
USPC .............. 220/326, 324, 315, 4.23, 4.24, 4.21, 220/4.22, 839, 837, 836, 802, 805, 791, 220/DIG. 30; D9/426, 425, 424, 443, 436, D9/435
IPC .................................. B65D 45/20, 45/18, 45/16
See application file for complete search history.

(56) References Cited

U.S. PATENT DOCUMENTS

| 3,176,879 A | * | 4/1965 | Mojonnier .................... 222/143 |
| 3,381,876 A | | 5/1968 | Biggins |
| 3,442,420 A | | 5/1969 | Edwards |
| 3,617,104 A | | 11/1971 | Stadig |
| 3,688,942 A | * | 9/1972 | Mitchell et al. ............... 220/784 |
| 3,784,052 A | | 1/1974 | Edwards |
| 3,952,903 A | | 4/1976 | Sanders et al. |
| 4,018,338 A | | 4/1977 | Lemkin |
| 4,098,453 A | | 7/1978 | Arneson |
| 4,127,189 A | | 11/1978 | Shumrak et al. |
| 4,280,648 A | | 7/1981 | Boursier |
| 4,337,116 A | | 6/1982 | Foster et al. |
| D265,711 S | | 8/1982 | Dunden |
| D283,666 S | | 5/1986 | Holzkopf |
| D292,379 S | | 10/1987 | Pollitt |
| 4,697,703 A | | 10/1987 | Will |
| D324,651 S | | 3/1992 | Kaneko |
| 5,094,355 A | | 3/1992 | Clark et al. |
| 5,203,491 A | | 4/1993 | Marx et al. |
| 5,234,159 A | | 8/1993 | Lorence et al. |
| 5,347,753 A | | 9/1994 | Dall |
| D353,327 S | | 12/1994 | Castner et al. |
| 5,377,860 A | * | 1/1995 | Littlejohn et al. ............ 220/790 |

(Continued)

FOREIGN PATENT DOCUMENTS

JP 2007204107 A * 8/2007 ............. B65D 45/20

OTHER PUBLICATIONS

Translation of JP 2007204107 (TSUBOTA), Aug. 16, 2007, Paragraphs 16 and 23.*

*Primary Examiner* — Robert J Hicks
(74) *Attorney, Agent, or Firm* — Thomas J. Nikolai; Nikolai & Mersereau, P.A.

(57) ABSTRACT

A biodegradable container made of natural fibrous materials includes two shells, each integrally formed and having surfaces which mate with each other to form an enclosure. At least one of the shells includes latching members rotatable about living hinges between a first position, which permits the shells to be coupled to and decoupled from each other, and a second over-center position wherein engagement surfaces of the latching members contact a surface of the other shell to secure the two shells together.

11 Claims, 5 Drawing Sheets

(56) References Cited

U.S. PATENT DOCUMENTS

| | | |
|---|---|---|
| 5,423,477 A | 6/1995 | Valdman et al. |
| 5,543,186 A * | 8/1996 | Andersen et al. ............ 428/34.4 |
| 5,593,054 A | 1/1997 | Glynn |
| 5,662,237 A | 9/1997 | Cain |
| 5,714,217 A * | 2/1998 | Andersen et al. ............ 428/34.5 |
| D391,850 S | 3/1998 | Krupa et al. |
| D395,003 S | 6/1998 | Daniels |
| D395,796 S | 7/1998 | Krupa et al. |
| D398,524 S | 9/1998 | Waterhouse |
| D414,409 S | 9/1999 | Sanfilippo et al. |
| D427,902 S | 7/2000 | Hayes et al. |
| D429,147 S | 8/2000 | Baker et al. |
| D432,409 S | 10/2000 | Feldmeier |
| 6,196,404 B1 | 3/2001 | Chen |
| D444,058 S | 6/2001 | Hampshire et al. |
| 6,257,434 B1 | 7/2001 | Lizzio |
| D450,240 S | 11/2001 | Haag et al. |
| D456,247 S | 4/2002 | Castellanos et al. |
| 6,376,583 B1 | 4/2002 | Winkler et al. |
| D462,901 S | 9/2002 | Giard, Jr. et al. |
| 6,554,147 B1 | 4/2003 | Maida, Jr. et al. |
| 6,639,199 B1 | 10/2003 | Ross, Jr. |
| 6,748,722 B2 | 6/2004 | Correll |
| 6,753,073 B2 | 6/2004 | Lin |
| D504,326 S | 4/2005 | Vovan |
| 7,048,975 B1 | 5/2006 | Tojo et al. |
| 7,097,066 B2 | 8/2006 | Tucker et al. |
| 7,124,910 B2 | 10/2006 | Nordland |
| D551,091 S | 9/2007 | Shahsavarani et al. |
| D553,012 S | 10/2007 | Changpan |
| D572,149 S | 7/2008 | Mangino et al. |
| D576,449 S | 9/2008 | Boudewijns |
| D581,781 S | 12/2008 | Enriquez |
| D584,108 S | 1/2009 | Olsson |
| D587,568 S | 3/2009 | Shields |
| D591,173 S | 4/2009 | Church |
| D594,324 S | 6/2009 | Colacitti |
| D594,326 S | 6/2009 | Colatti |
| D598,742 S | 8/2009 | Arevalo et al. |
| 7,726,483 B2 | 6/2010 | Ramanujam et al. |
| D625,994 S | 10/2010 | Krupa |
| D627,635 S | 11/2010 | Krupa |
| D649,448 S | 11/2011 | Wu |
| 8,056,751 B2 | 11/2011 | Vovan |
| 2001/0040016 A1 | 11/2001 | Kumamoto et al. |
| 2002/0096450 A1 | 7/2002 | Garst |
| 2005/0121163 A1 | 6/2005 | Renck et al. |
| 2005/0150624 A1 | 7/2005 | Toh et al. |
| 2006/0021889 A1 * | 2/2006 | Kim ............................ 206/320 |
| 2006/0048909 A1 | 3/2006 | Yeh et al. |
| 2006/0054292 A1 | 3/2006 | Yeh et al. |
| 2007/0295631 A1 | 12/2007 | Lin et al. |
| 2008/0110911 A1 * | 5/2008 | Chen ............................ 220/788 |
| 2009/0057381 A1 | 3/2009 | Gokhale |
| 2009/0218360 A1 * | 9/2009 | Suk ............................ 220/784 |
| 2010/0044267 A1 | 2/2010 | Tolibas-Spurlock et al. |
| 2010/0051498 A1 | 3/2010 | Tsai |
| 2010/0170824 A1 | 7/2010 | Ramanujam et al. |
| 2010/0236966 A1 | 9/2010 | Luttik et al. |

* cited by examiner

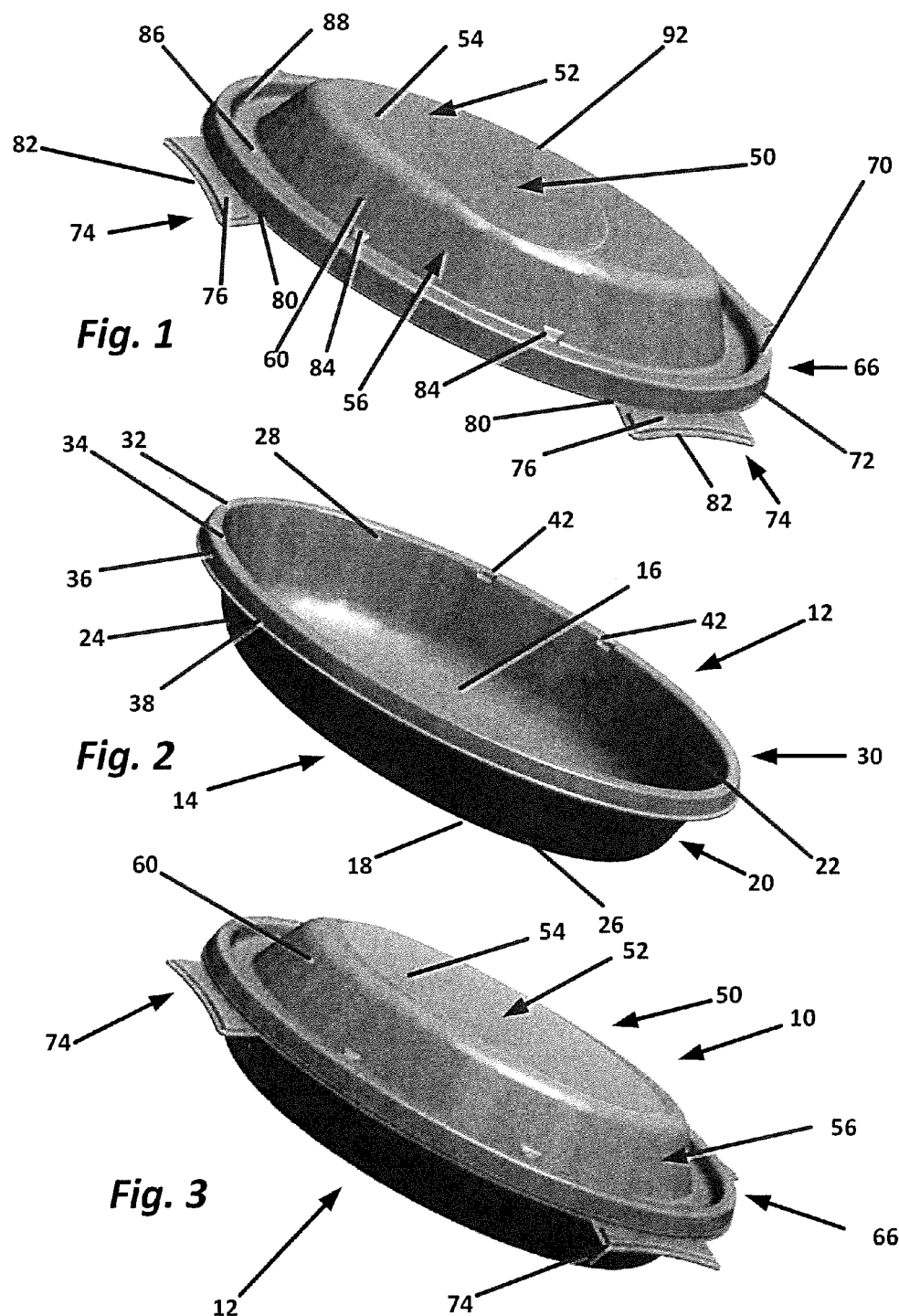

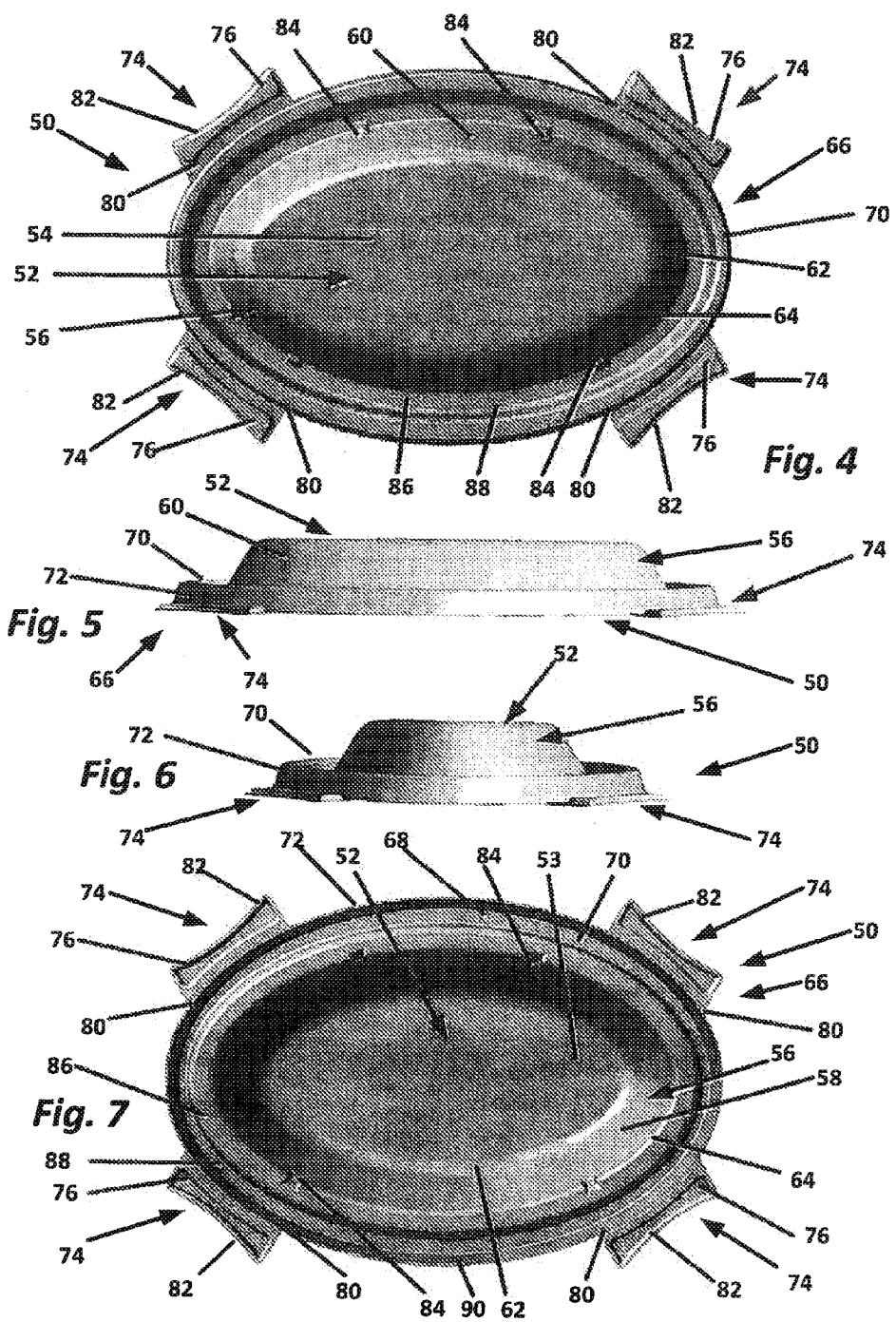

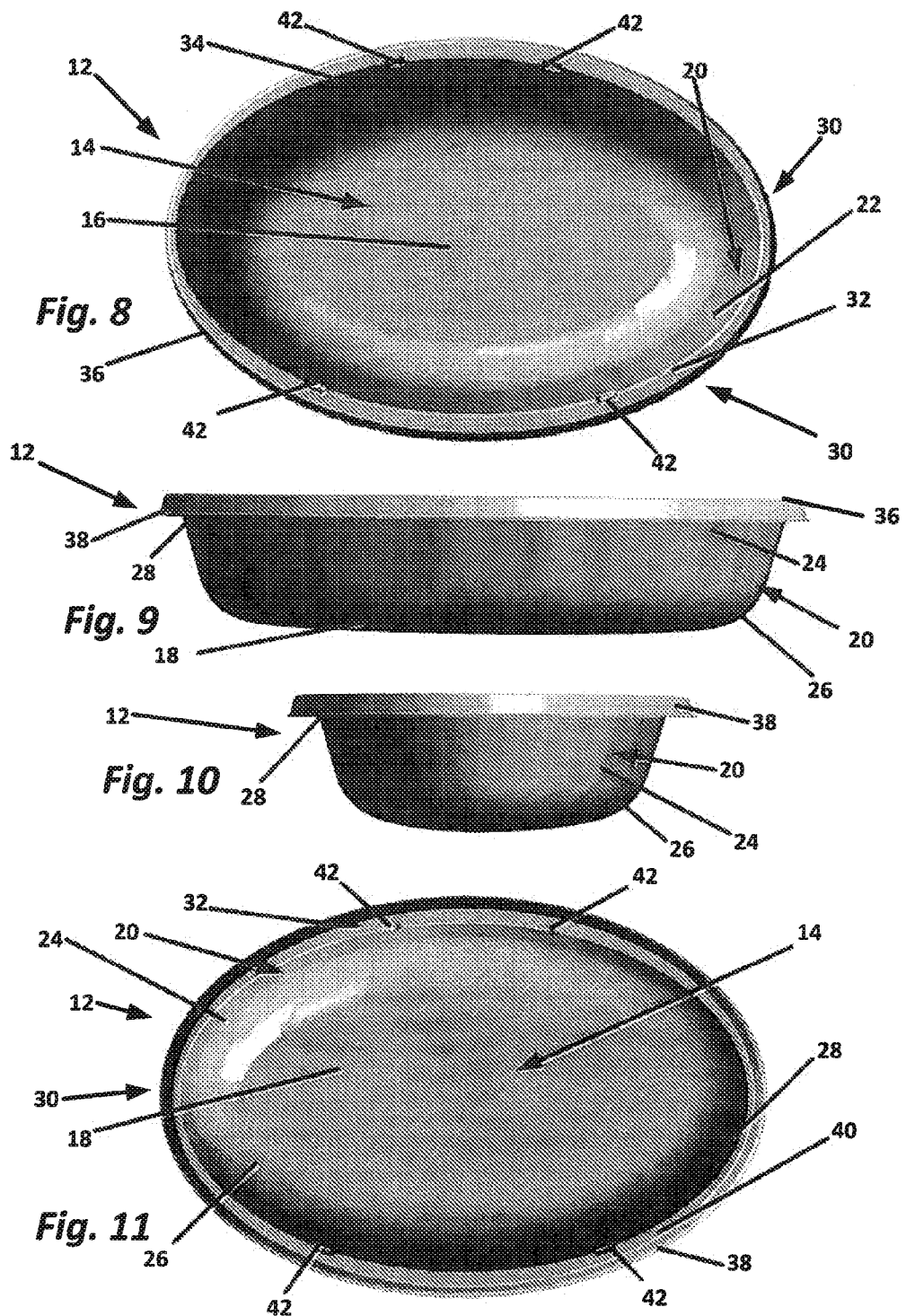

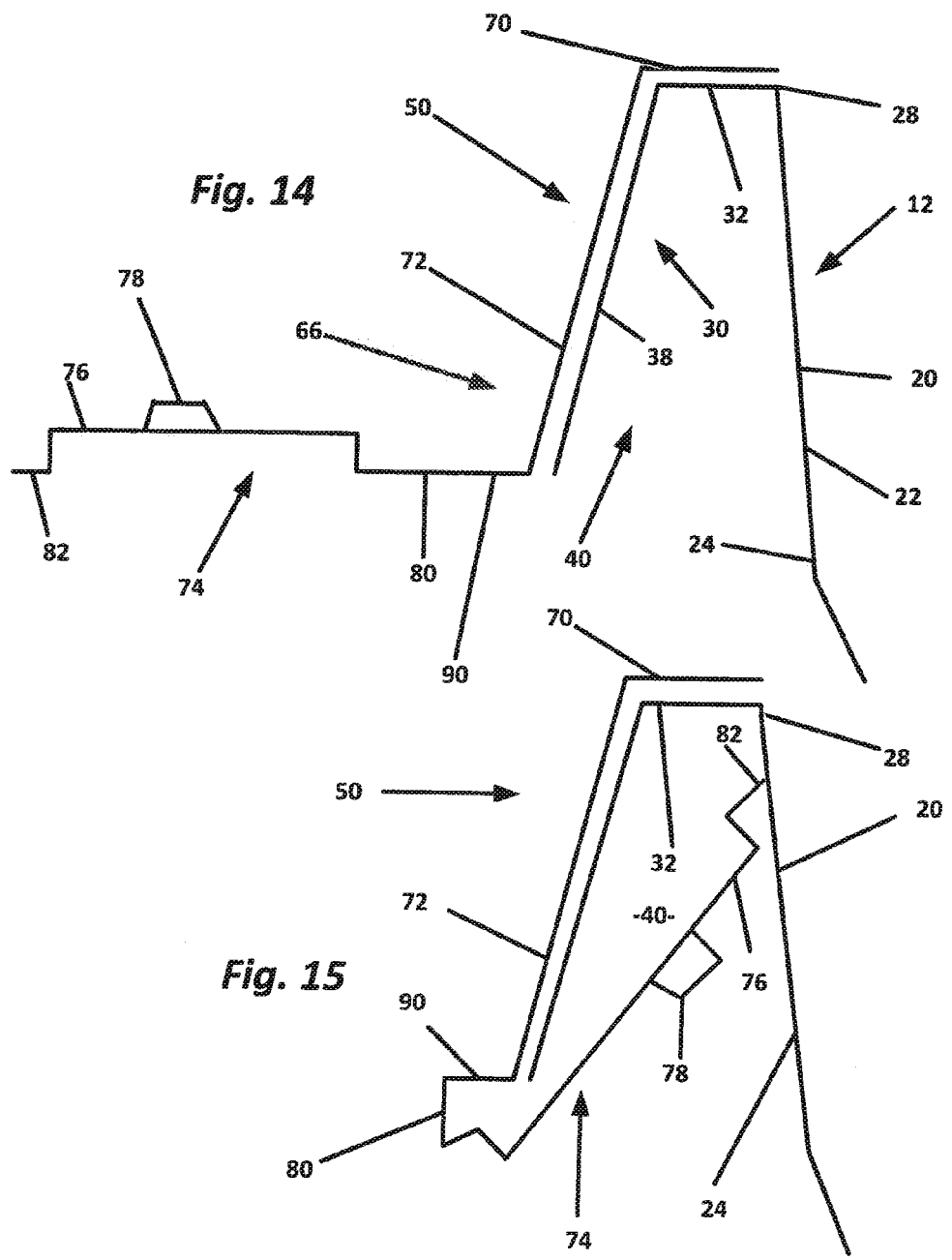

BIODEGRADABLE FOOD SERVICE CONTAINER

CROSS-REFERENCED TO RELATED APPLICATIONS

Not applicable.

STATEMENT REGARDING FEDERALLY SPONSORED RESEARCH OR DEVELOPMENT

Not applicable.

BACKGROUND OF THE INVENTION

I. Field of the Invention

The present invention relates to biodegradable containers. More specifically, the present invention relates to containers having a first shell member and a second shell member, each made of a natural fibrous material which will quickly and easily biodegrade after use if deposited in a landfill or the like. When used to contain food, the two shells of the container cooperate to form an enclosure and the two shells of the container are latched together to seal food within the container as the food is shipped or prepared. The shell members may also be used as a serving dish as the food is consumed.

II. Description of the Prior Art

Various types of containers are used by food distributors, grocers and restaurants to package food. All such packaging, however, suffers from one or more deficiencies making them less than ideal for use. Such containers are often made of aluminum, glass or plastic. Sometimes paper products are employed, however, such paper products are often coated with materials designed to make the package more durable and fluid resistance. These coatings also make such packaging slower to biodegrade and more difficult to effectively recycle. Such packages are a major source of litter and trash.

Aluminum, glass and plastic are often employed because they are easily formed into a desired shape. However, such packages are expensive to manufacture, particularly those made of plastics derived from oil when oil prices are high. Paper and cardboard packages are not so easily molded and typically require the use of adhesives, inks and coatings which increase costs and exacerbate environmental issues.

SUMMARY OF THE INVENTION

Containers made in accordance with the present invention are low cost, made from readily renewable or recycled resources, do not require the use of adhesives and are quickly biodegradable and compostable. Such containers may be used for transporting, cooking, and heating and even service of food items. Such cooking can occur in either a microwave oven or a conventional oven set to temperatures as high as 425° F. Thus, containers made in accordance with the present invention are superior in many important respects to the containers of the prior art.

Containers made in accordance with the present invention are made of fibrous plant materials such as bamboo, wheat, straw, bagasse or the like. Recycled paper may also be employed provided that the recycled paper is first subjected to processes designed to remove inks, coating chemicals and the like. The materials used to construct the containers are formed into slurry which is then subjected to a molding and cooking process. The molding and cooking process is carried out at high temperatures (in the 350° F. range) and at high press (15 to 20 tons per square inch) to drive out the moisture from the slurry and form the fibers into a suitable shape. Various plant based starch materials may be added in low concentrations (less than 1%) to make the container more oil and moisture resistant. Other additives may also be employed for this purpose.

The food containers of the present invention generally comprise first and second shell members. Both are made of a fibrous natural material. The first shell member comprises a base having a top and a bottom, a first continuous side wall having inside and outside surfaces extending between a first end contiguous with the outer edge of the base and a second end. The first shell member also includes a first mating member comprising a contiguous ledge extending between an inner edge proximate the second end of the side wall and an outer edge terminating in a lip extending from the outer edge of the ledge. More specifically, the first mating member is constructed such that a portion of the side wall, the ledge and the lip form a first channel.

The second integrally formed shell member comprises a second base having a top and a bottom and a second continuous side wall having inside and outside surfaces extending between a first end contiguous with the second base and a second end. The second integrally formed shell member also includes a second mating member. The second mating member includes a continuous channel defined at least in part by a first flange extending outwardly proximate the second end of the second contiguous side wall, a second flange extending from the first flange in a plurality of latch members. The latch members extend between living hinges joining the latching members to the rest of the second mating member and engagement surfaces. The living hinges permit the latch members to pivoted between first and second positions. When the latching members are in their first position, the first mating member of the first shell member is insertable into and removable from the second channel of the second mating member of the second shell member such that the first and second shell members form an enclosure when so mated. With the first mating member inserted into the second channel of the second mating member, the hinged latching members may be pivoted to their second position causing the engagement surfaces of the latching members to enter the first channel and, upon reaching a second position, the latching members are over-center and the engagement surfaces are in engagement with the outside surface of the side wall of the first shell member The first shell member is thereby latched to the second shell member so the two shell members do not become unintentionally separated from each other.

Various other features may be incorporated into the container described above. For example, either the first or the second shell member, or both shell members, may be provided with a plurality of de-nesting lugs such that when a stack of first shell members and a stack of second shell members are provided at a food packaging station, the shell members can be more easily removed from their respective stacks. To make it easier to unlatch the latching members to permit the shell members to be separated and the container to be opened, each latching member may be provided with a gripping tab which is easily gripped by a user between the user's thumb and forefinger. To increase the rigidity of the latching members, each may be provided with one or more dimples. One or more dimples may also be provided in the base of either the first or second shell members to improve the rigidity of the base. Likewise, one or more ribs may be provided in the side walls of the first or second shell members to improve the rigidity of the side walls.

By adopting the principles of the subject invention, containers of various shapes can be made. For example, the base of either the first or second shell member, or both shell members, can have an oval shape, a rectangular shape or many other desired shapes without deviating from the invention. In some configurations, a manufacturer may find it useful to additionally provide the second mating member of the second shell with a first wall projecting outwardly from the second end of the second side wall and a second wall coupling the first wall to the first flange such that the second channel is defined by the second wall, the first flange and the second flange. Further, a third flange, intermediate the living hinges and the second flange, may be provided to ensure appropriate clearance and interaction between the engagement surfaces of the latches with the outer surface of the side wall of the first shell member.

These and other attributes of the present invention will become better understood from a review of the drawings provided as a part of this specification together with the detailed description of the invention provided below.

BRIEF DESCRIPTION OF THE DRAWINGS

FIG. 1 is a perspective view of a first stackable member used to form a container made in accordance with the subject invention.

FIG. 2 is a perspective view of a second stackable member used in conjunction with the stackable member shown in FIG. 1 to form a container made in accordance with the present invention.

FIG. 3 is a perspective view showing the stackable member of FIG. 1 and the stackable member of FIG. 2 jointed together to form an enclosed container.

FIG. 4 is a top plan view of the stackable member shown in FIG. 1.

FIG. 5 is a side elevational view of the stackable member shown in FIG. 1.

FIG. 6 is an end elevational view of the stackable member shown in FIG. 1.

FIG. 7 is a bottom plan view of the stackable member shown in FIG. 1.

FIG. 8 is a top plan view of the stackable member shown in FIG. 2.

FIG. 9 is a side elevational view of the stackable member shown in FIG. 2.

FIG. 10 is an end elevational view of the stackable member shown in FIG. 2.

FIG. 11 is a bottom plan view of the stackable member shown in FIG. 2.

FIG. 14 is a schematic representation illustrating a latch in a first position.

FIG. 15 is a schematic diagram showing the latch of FIG. 14 in a second position.

DETAILED DESCRIPTION

Figure 12:
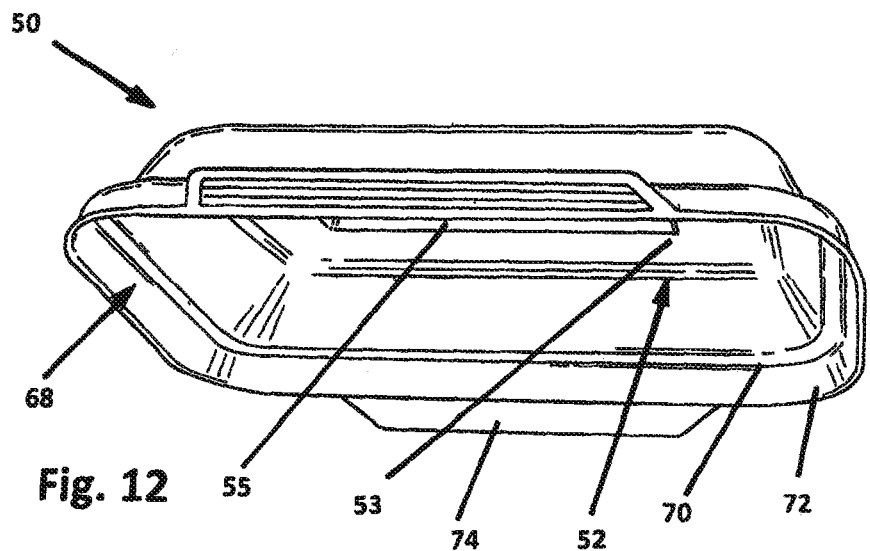
FIG. 12 is a perspective view showing an alternative embodiment of the shell arrangement shown in FIG. 1.

The drawings show a food container 10. Each food container 10 comprises a first shell member 12 and a second shell member 50. The shell members are designed so that, at a food packaging station in a processing plant, restaurant, or the like, a stack of first shell members 12 may be provided and a stack of second shell members 50 may also be provided. Workers at the packaging station then employ a shell member 12 and a shell member 50 to create enclosed food containers as shown in FIG. 3. One of the shells 12 and 50 serve as the tray and the other serves as the lid which acts as a lid and which acts as a tray is immaterial to the present invention. One of each type of shell member 12 and 50 is employed to create a food container which securely contains food items within the container.

As best illustrated in FIGS. 2 and 8-11, the first shell member 12 includes a first base 14 which has a top 16 and a bottom 18. The first shell member 12 also includes a side wall 20 having an inside surface 22 and an outside surface 24. The side wall has a first end contiguous with the outer edge of the base 14. The side wall extends from the first end 26 away from the base to a second end 28. The first shell member also includes a first mating member 30 as illustrated in FIGS. 2 and 8-11, the first mating member 30 comprises a ledge 32 extending between an inner edge 34 and an outer edge 36. The inner edge 34 of the ledge 32 is contiguous with the second end of the side wall 28. The first mating member also has a lip 38 extending from the outer edge 36 of the ledge 32. As such, a first channel 40 is formed by at least a portion of the side wall 20 near the second end 28 of the side wall 20, the ledge 32 and the lip 38. FIGS. 2, 8 and 11 also illustrate de-nesting lugs 42 which assist in removing a first shell member from a stack of such shell members.

Figure 13:
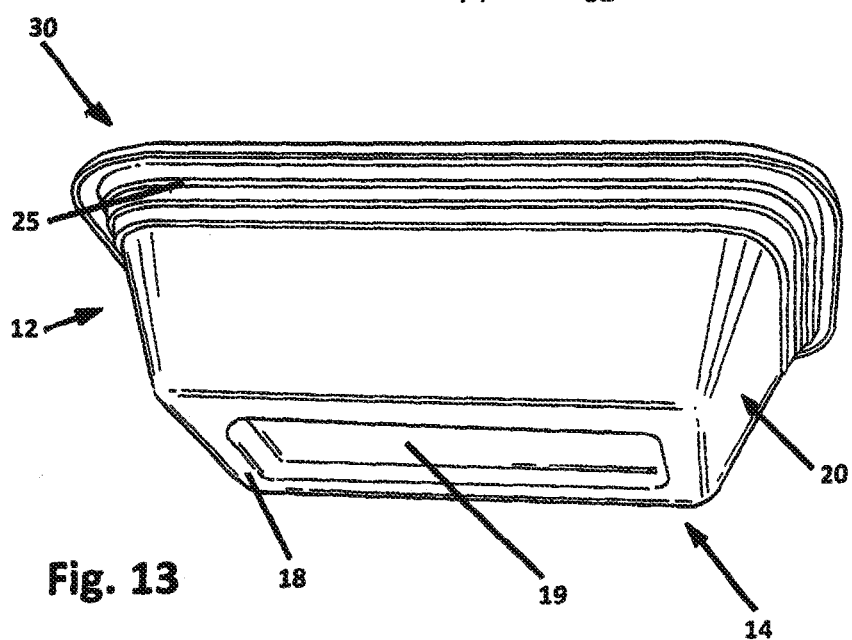
FIG. 13 is a perspective view showing an alternative embodiment of the shell arrangement shown in FIG. 2.

FIG. 13 shows an alternative embodiment of the first shell member shown in FIGS. 2 and 8-11. In this embodiment, the base has a rectangular shape rather than an oval shape. The base also has a dimple 19 which helps improve the rigidity of the base. Further, a plurality of ribs 25 are provided in the side wall 20 adjacent the second end 28 of the side wall 20 to improve the rigidity of the side wall.

The construction of the second shell member 50 is best shown in FIGS. 1 and 4-7. As illustrated, the second shell member 50 includes a second base 52, having a bottom 53 and a top 54, and a second continuous side wall 56. The second side wall 56 has an inside surface 58 and an outside surface 60. A first end 62 of side wall 56 is contiguous with the outside edge of the base 52. The side wall 56 extends between this first end 62 and a second end 64. A second mating member 66 is joined to the second end 64 of the side wall 56. The second mating member 66 provides a second continuous channel 68 formed at least in part by a first flange 70 and a second flange 72. The second mating member also has a plurality of latches 74 coupled either directly or indirectly by living hinges 80 to the second flange 72. The latching members 74 are each shown as extending between a living hinge 80 and engagement surfaces 82. The latching members 74 may be provided with dimples 76 which help improve the rigidity of the latching members 74. Gripping tabs 78 may also be provided as shown in FIGS. 14-15. As explained in further detail below, the living hinges 80 permit the latching members 74 to be pivoted between a first position shown in FIGS. 1, 3, 4-7 and 14 and a latched position shown in FIG. 15. As illustrated in FIGS. 1 and 4-7, the second mating member 66 may also include a first wall 86 projecting from the second end 64 of the second side wall 56 as well as the second wall 88 extending between the first wall 86 and the first flange 70. A third flange 90 may also be provided intermediate the living hinges 80 and the second flange 72.

FIG. 12 shows an alternative embodiment of the second shell member 50. The embodiments of the first and second shell members shown in FIGS. 12-13 are intended to be used together to form an enclosed container.

As illustrated in the drawings, other features may be incorporated into the second shell member 50 without deviating from the invention. Such features could include de-nesting lugs 84, labeling 92, dimples 55 in the base as illustrated in FIG. 12 or ribs in the side wall (not shown). Such ribs might be like the ribs 25 illustrated in FIG. 13.

FIGS. 3, 14 and 15 are provided to better illustrate how shells 12 and 50 work together and provide an enclosed container 10. With the latching member 74 in their first position as illustrated in FIGS. 3 and 14, the first mating member 30 of the first shell member 12 and the second mating member 66 of the second shell member 50 can be mated to each other. Specifically, the ledge 32 of the first shell member 12 may be inserted into the second continuous channel 68 of the second mating member 66. With the ledge 32 fully seated within the second contiguous channel 68, the latching members 74 can then be rotated about the living hinges 80 such that the engagement surfaces 82 enter the first channel 40 of the first shell member 12. Continued rotation of a latching member 74 about its living hinge 80 will cause the latching member 74 to achieve an over-center position, an example which is illustrated in FIG. 15, with the engagement surface 82 in contact with the outside 24 of the side wall 20 of the first shell member 12. In this over center position, the latching members 74 serve to secure the first shell member 12 to the second shell member 50 to form an enclosure. The over-centered position of the latching members 74 and the contact between the engagement surfaces 82 and side wall 20 means a substantial force will have to be applied to return the latching members 74 to the first, unlatched position. Only then can the first shell member 12 and second shell member 50 can be separated from each other. To assist in unlatching the latching members 74, the latching members can be provided with gripping tabs 78 such as those shown in FIGS. 14 and 15. The gripping tabs 78 can be gripped between the thumb and forefinger of the user.

The design principles discussed above may be employed to create shell members having other shapes without deviating from the invention. While the drawings illustrate the shell members having a general oval shape in the case of FIGS. 1-11 and a generally rectangular shape in the case of FIGS. 12 and 13, a round shape, a square shape, a triangular shape, a hexagonal shape, or many other shapes may be employed without deviating from the invention. In fact, essentially any geometric shape may be employed without deviating from the invention. Also, while the mating members of the two devices are illustrated as continuous, this is not necessarily the case. Also, while the drawings show either two or four latching members, those skilled in the art will appreciate that a different number of latching members may be employed without deviating from the invention. Still other modifications may be made which embody the present invention.

Thus, the present invention is not to be limited to the specific embodiments of the invention described above. The invention is only limited to the subject matter defined by the following claims together with a full range of the equivalents.

The invention claimed is:

1. A container comprising:
   a. a first integrally formed shell member made of a fibrous plant material and comprising a first base having a top and bottom; a first continuous side wall having inside and outside surfaces and extending between a first end contiguous with the first base and a second end; and a first mating member comprising a continuous ledge extending between an inner edge proximate the second end of the side wall and an outer edge terminating in a lip extending from the outer edge of the ledge such that a portion of the side wall, the ledge and the lip form a first channel; and
   b. a second integrally formed shell member made of a fibrous plant material and comprising a second base having a top and bottom; a second contiguous side wall having inside and outside surfaces and extending between a first end contiguous with the second base and a second end; and a second mating member comprising a second continuous channel, said second channel defined at least in part by a first flange extending outwardly proximate the second end of the second contiguous side wall, a second flange extending from the first flange and a plurality of latching members extending between living hinges joining the latching members to the rest of the second mating member and engagement surfaces, wherein the latching members are pivotable about the living hinges between first and second positions, and wherein when the latching members are in their first position, the first mating member is insertable into and removable from the second channel of the second mating member such that when the first mating member is insertable into the second channel of the second mating member the first shell member and a second shell member form an enclosure, and wherein with the first mating member inserted into the second channel of the second mating member, pivoting the latching members from their first position to their second position causes the engagement surfaces of the latching members to enter the first channel, and, upon reaching the second position, be in over-center engagement with the outside surface of the side wall of the first shell member at a location within the first channel thereby latching the first shell member to the second shell member.

2. The container of claim 1 wherein the first shell further comprises a plurality of de-nesting lugs.

3. The container of claim 2 wherein the second shell member further comprises a plurality of de-nesting lugs.

4. The container of claim 1 wherein each of the latching members further comprise a gripping tab.

5. The container of claim 1 wherein each of the latching members include at least one dimple for increasing rigidity.

6. The container of claim 1 further including a third flange intermediate the living hinges and the second flange.

7. The container of claim 1 wherein the first base and the second base each have a substantially oval shape.

8. The container of claim 1 wherein the first base and the second base each have a substantially rectangular shape.

9. The container of claim 1 wherein the first base includes at least one dimple for increasing rigidity of the first base.

10. The container of claim 1 wherein the second base includes at least one dimple for increasing the rigidity of the second base.

11. The container of claim 1 wherein at least one of the side walls includes at least one rib for increasing the rigidity of the side wall.

* * * * *